(12) United States Patent
Ostrowski et al.

(10) Patent No.: US 11,112,023 B2
(45) Date of Patent: Sep. 7, 2021

(54) CHECK VALVE

(71) Applicant: Hamilton Sundstrand Corporation, Charlotte, NC (US)

(72) Inventors: Maciej Ostrowski, Wrocław (PL); Zbigniew Jaśkiewicz, Wrocław (PL)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/707,166

(22) Filed: Dec. 9, 2019

(65) Prior Publication Data
US 2020/0182368 A1 Jun. 11, 2020

(30) Foreign Application Priority Data
Dec. 10, 2018 (EP) .................................... 18461641

(51) Int. Cl.
*F16K 27/02* (2006.01)

(52) U.S. Cl.
CPC ................................ *F16K 27/0209* (2013.01)

(58) Field of Classification Search
CPC ..... Y10T 137/87523; Y10T 137/87531; Y10T 137/7839; Y10T 137/7841; Y10T 137/7846; Y10T 137/7898; Y10T 137/7903; F16K 27/0209; F16K 27/0218; F16K 27/0227; F16K 15/03; F16K 15/035; F16K 15/036
See application file for complete search history.

(56) References Cited

U.S. PATENT DOCUMENTS

| 1,673,831 | A | * | 6/1928 | Kuehne | F16K 15/035 |
| | | | | | 137/527 |
| 3,384,112 | A | * | 5/1968 | Smith | F16K 15/036 |
| | | | | | 137/512.1 |
| 4,781,212 | A | * | 11/1988 | Scaramucci | F16K 15/03 |
| | | | | | 137/515.7 |
| 5,056,548 | A | * | 10/1991 | Mills | F16K 15/03 |
| | | | | | 137/15.18 |

(Continued)

FOREIGN PATENT DOCUMENTS

| EP | 3193059 A1 | 7/2017 |
| EP | 3318786 A1 | 5/2018 |

(Continued)

OTHER PUBLICATIONS

European Search Report for EP Application No. 18461641.5 dated May 27, 2019.

*Primary Examiner* — Jessica Cahill
(74) *Attorney, Agent, or Firm* — Carlson, Gaskey & Olds, P.C.

(57) ABSTRACT

A check valve has a valve housing defining a first valve opening and a second valve opening. A first flapper is pivotably mounted around a first axis for rotation relative to the housing between an open position at which it permits fluid flow through the first valve opening and a closed position at which it prevents fluid flow through the first valve opening. A second flapper is pivotably mounted around a second axis for rotation relative to the housing between an open position at which it permits fluid flow through the second valve opening and a closed position at which it prevents fluid flow through the second valve opening. The first axis is spaced laterally from the second axis. A method is also disclosed.

19 Claims, 10 Drawing Sheets

(56) References Cited

U.S. PATENT DOCUMENTS

| | | | |
|---|---|---|---|
| 6,796,327 B2* | 9/2004 | Bodnar | F16K 15/035 137/512.1 |
| 8,844,563 B2* | 9/2014 | Hawa | F16K 15/03 137/512.1 |
| 10,088,065 B2 | 10/2018 | Olejak | |
| 10,344,882 B2* | 7/2019 | Skorupa | F16K 15/035 |
| 10,794,502 B2* | 10/2020 | JaŚKiewicz | F16K 47/023 |
| 2003/0089404 A1* | 5/2003 | Bodnar | F16K 15/035 137/512.1 |

FOREIGN PATENT DOCUMENTS

| | | |
|---|---|---|
| GB | 1187882 A | 4/1970 |
| GB | 1563487 A | 3/1980 |
| GB | 2096281 A | 10/1982 |
| JP | S58-157074 | 10/1983 |

* cited by examiner

CHECK VALVE

CROSS-REFERENCE TO RELATED APPLICATIONS

This application claims priority to European Patent Application No. 18461641.5 filed on Dec. 10, 2018.

TECHNICAL FIELD

The present disclosure relates to check valves and flappers therefor.

BACKGROUND

Check valves are valves that allow fluid flow in one direction and prevent flow in the opposite direction. They are widely used in a range of applications. As examples they are used in ventilation and air conditioning systems, say aircraft ventilation and air conditioning systems. Check valves are also used in main engine starting systems.

Check valves commonly include a pair of valve elements or flappers located at an opening in a valve housing. The flappers are supported for rotation between a closed position at which they lie across and close the opening, preventing fluid (for example, air) flow through the opening in one direction, and an open position at which, under pressure of a fluid on one side of the check valve, the flappers rotate from their closed positions to allow the fluid to flow through the valve in the opposite direction.

Typically, a stop is provided to limit the rotational movement of the flapper elements as they open. The stop often has a stop pin, which is mounted to posts arranged on opposite sides of the valve housing opening. The stop pin is spaced from the opening such that when the flappers open, they engage the stop pin. One example of such a check valve is disclosed in U.S. Pat. No. 10,088,065 B2.

In known check valve arrangements, the flappers are hingedly supported on a common hinge pin mounted to the valve housing. This may result in vibrations being transferred between the flappers on opening and closing. In particular, impact of the flappers with the stop pin or the valve housing can raise challenges.

SUMMARY

From a first aspect, the present disclosure provides a check valve including a valve housing, a first flapper and a second flapper. The valve housing defines a first valve opening and a second valve opening. The first flapper is pivotably mounted around a first axis for rotation relative to the housing and moves between an open position at which it permits fluid flow through the first valve opening and a closed position at which it prevents fluid flow through the first valve opening. The second flapper is pivotably mounted around a second axis for rotation relative to the housing between an open position at which it permits fluid flow through the second valve opening and a closed position at which it prevents fluid flow through the second valve opening. The first axis is spaced laterally from to the second axis.

The fluid flow may be air flow.

The first axis may be generally parallel to the second axis.

The check valve may include a stop element arranged such that the flappers will contact the stop element at their open positions.

The housing may include a pair of opposed mounts and the first and second flappers may be pivotably mounted between the mounts by means of respective flapper spindles.

Each of the mounts may include a mounting post.

Each of the first and second mounts may include a bore and each of the flapper spindles may be received within a respective bore.

In one embodiment, each flapper spindle may be formed integrally with a respective flapper.

In another embodiment, each flapper spindle may be formed separately from a respective flapper and mounted thereto.

In another embodiment, each flapper spindle may be formed separately from a respective flapper and a respective mount and received in respective bores therein.

The pair of opposed mounts may be formed separately from the valve housing and may be attached to the valve housing by fasteners.

The first flapper may be symmetrical about an axis transverse to the first axis and the second flapper may be symmetrical about an axis transverse to the second axis.

Each flapper may include a primary flapper element and at least one secondary flapper element. The primary flapper element may include at least one flapper opening formed therethrough and the at least one secondary flapper element may be pivotally mounted about a secondary flapper axis such that it may rotate relative to the primary flapper element for opening and closing the at least one flapper opening in the primary flapper element.

The secondary flapper axis of the first flapper may be coaxial with the first axis and the secondary flapper axis of the second flapper may be coaxial with the second axis.

Each of the primary flapper elements, and each of secondary flapper elements, may include at least one connecting lug and the valve may include a pair of connecting pins configured to be rotatably received in the connecting lugs of each flapper for mounting the secondary flapper elements to the primary flapper elements.

In another aspect, a flapper for a check valve includes a flapper portion and a pair of coaxial flapper mounting spindles. The flapper portion has first and second opposed sides.

The pair of coaxial flapper mounting spindles is formed integrally with the flapper portion and projects from and beyond the opposed sides of the flapper portion.

In yet another aspect, a method of making any of the preceding check valves includes mounting the first and second flappers on the pair of opposed mounts then attaching the pair of opposed mounts to the valve housing.

BRIEF DESCRIPTION OF DRAWINGS

Various embodiments of this disclosure will now be described by way of example only, with reference to the accompanying drawings in which.

DETAILED DESCRIPTION

Figure 1:
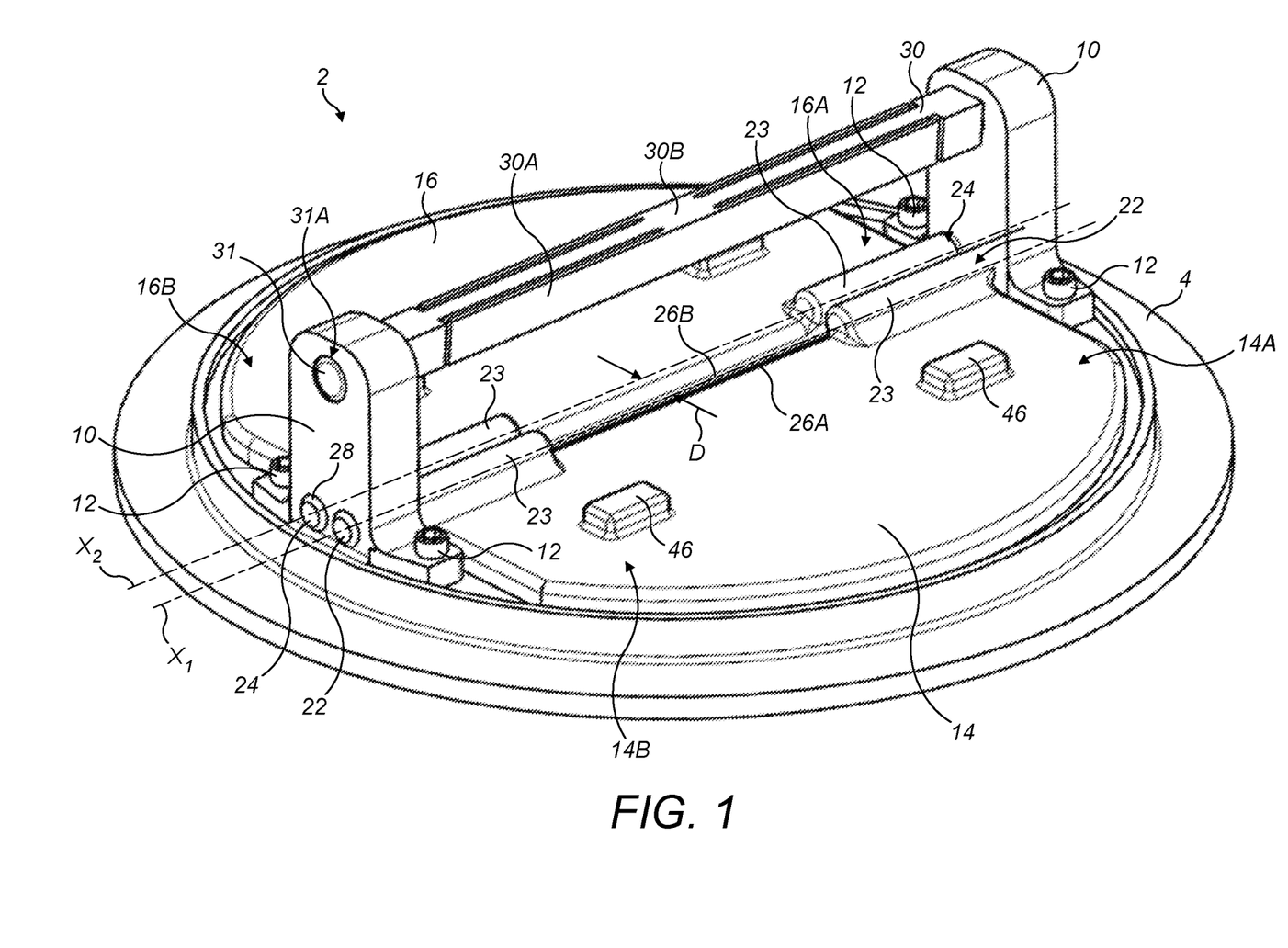
FIG. 1 shows a perspective view of a first embodiment of a check valve in accordance with this disclosure.
Figure 2:
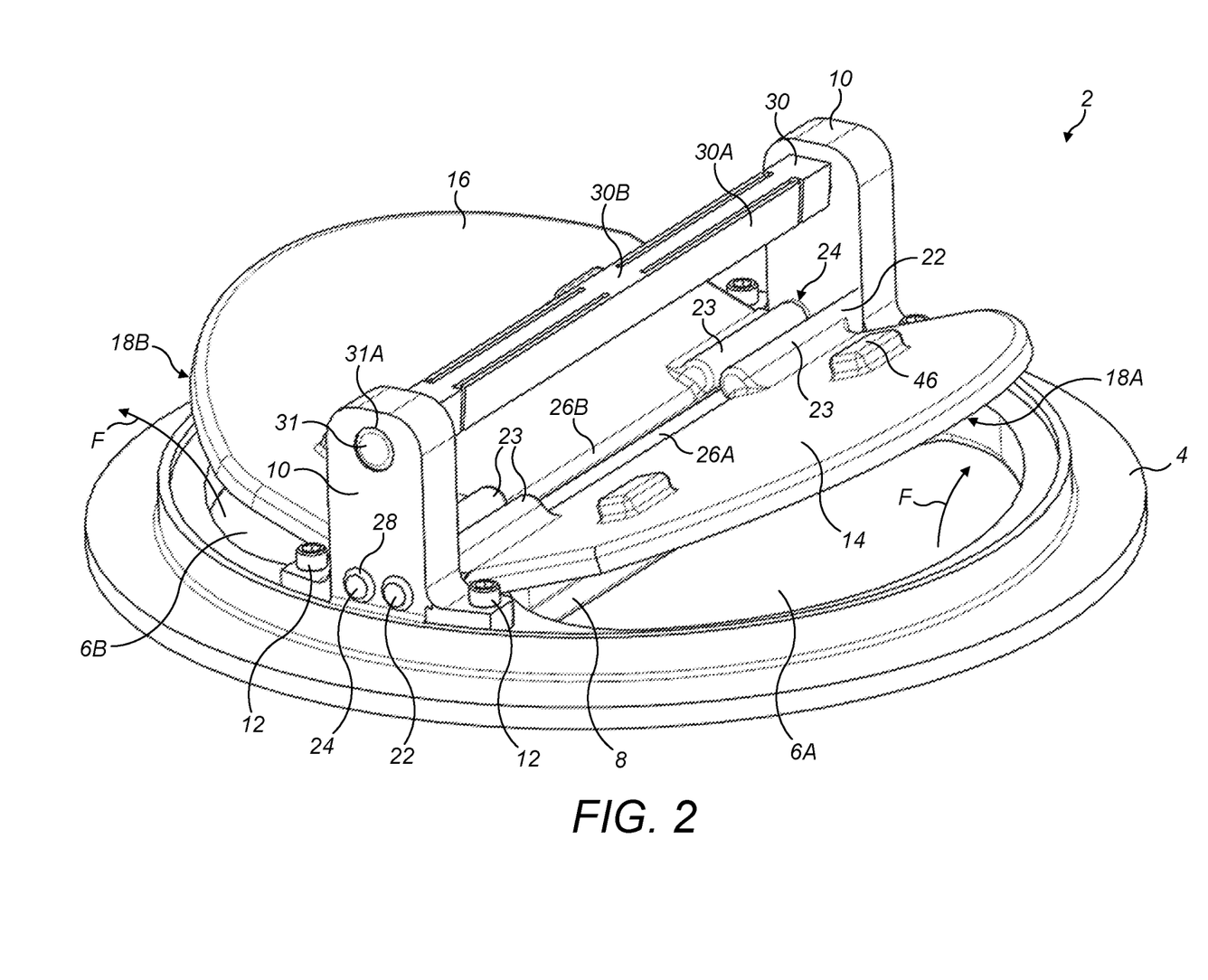
FIG. 2 shows a perspective view of a first embodiment of the check valve of FIG. 1 with the flappers partially open.
Figure 3:
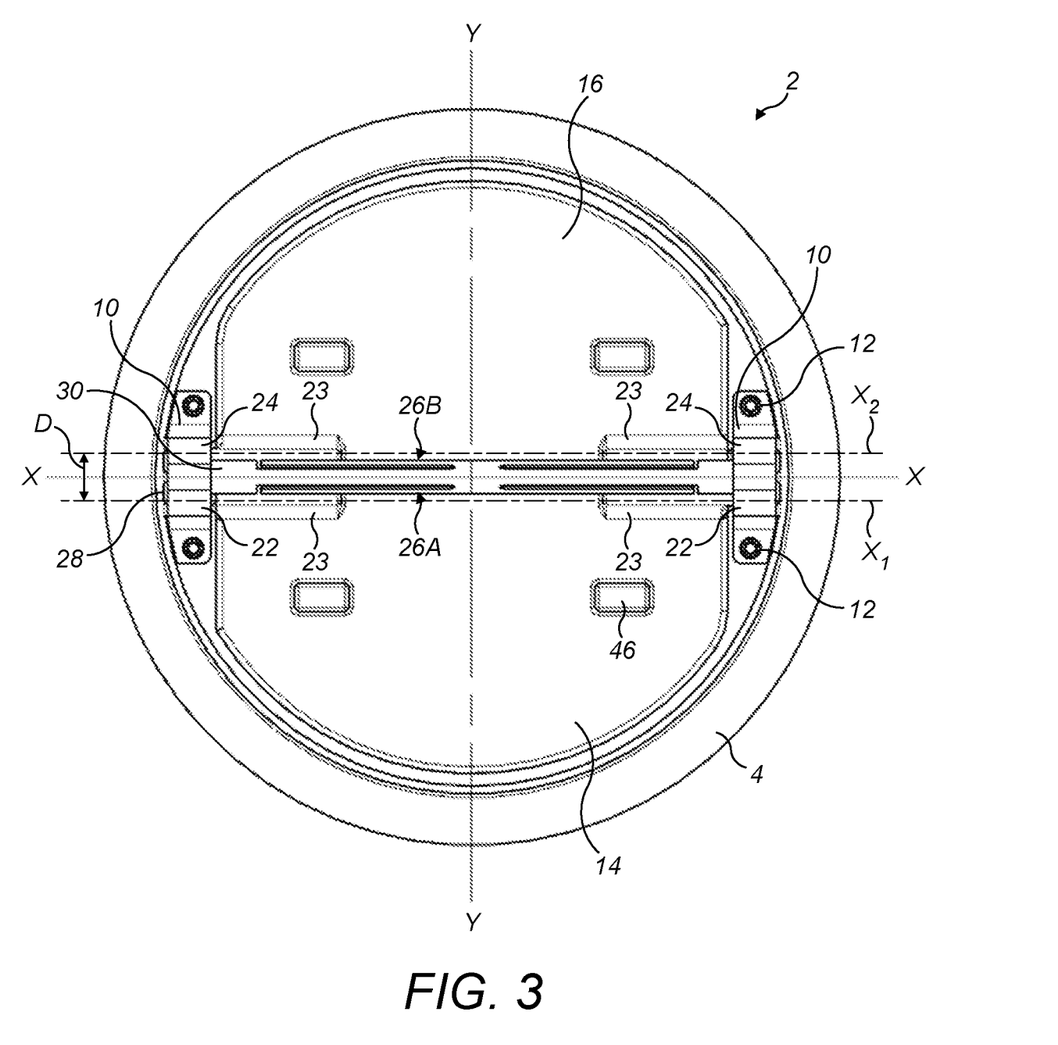
FIG. 3 shows a plan view of the check valve of FIG. 1.

With reference to FIGS. 1 to 3, a first embodiment of check valve 2 in accordance with this disclosure is illustrated.

The check valve 2 comprises a valve housing 4. The valve housing 4 is a generally planar annular element which in use may be mounted in a pipe, duct or the like. The valve housing 4 comprises a first generally D-shaped valve opening 6A and a second generally D-shaped valve opening 6B, which are separated by a central web 8 of the valve housing 4.

A pair of mounts, such as mounting posts 10, extend upwardly from the valve housing 4 on opposed sides of the valve openings 6A/6B. The mounting posts 10 may, as shown, be separately formed from the valve housing and mounted thereto by suitable means, for example by bolts or other fasteners 12. Alternatively, in some embodiments, the mounting posts 10 may be integrally formed, for example cast, with the valve housing 4. In some embodiments and as discussed further below, more than one mounting post 10 may be provided on each side of the valve openings 6A/6B.

The valve openings 6 are respectively closed by a first flapper 14 and a second flapper 16. The first and second flappers 14/16 may be generally D-shaped and generally planar. The first and second flappers have opposed sides 14A, 14B, 16A, 16B. The lower surface 18A/18B of each flapper 14/16 is configured to engage around the periphery of the associated valve opening 6A/6B when the valve 2 is closed. In the illustrated embodiment each flapper 14/16 comprises a single flapper element, however the flappers 14/16 may comprise multiple flapper elements (as described below with reference to FIGS. 4 to 10).

The first flapper 14 is pivotably mounted around a first axis $X_1$ for rotation relative to the valve housing 4. The second flapper 16 is pivotably mounted around a second axis $X_2$ for rotation relative to the valve housing 4. The first and second axes $X_1/X_2$ extend across the check valve housing and through the mounting posts 10 at the base of each mounting post 10 as shown. The first and second axes $X_1/X_2$ are spaced laterally a distance D from one another, and arranged generally parallel to one another. The check valve 2 and flappers 14/16 may be symmetrical about an axis Y perpendicular to the first and second axes $X_1/X_2$. As such the weight distribution of the flappers 14/16 may be accordingly symmetrical, which may result in an even distribution of forces resulting from opening and closing of the flappers 14/16. The check valve 2 and flappers 14, 16 may also be symmetrical about an axis X parallel to and between the first and second axes $X_1/X_2$. In an alternative arrangement, the axes $X_1$ and $X_2$ may be non-parallel to one another, for example at an angle of 5 degrees to one another; at angles between 0 and 5 degrees, or at an angle greater than 5 degrees.

The first and second flappers 14, 16 are configured to rotate between an open position, as shown in FIG. 2, in which they permit fluid flow F through first and second valve openings 6A/6B, and a closed position, as shown in FIGS. 1 and 3, in which they prevent fluid flow through the first and second valve openings 6A/6B. FIG. 2 shows the valve 2 in a partially open position. The flappers 14/16 may rotate further toward the vertical as shown in the figure to a completely open position wherein the flappers 14/16 cannot rotate any further (for example due to contact with the stop element 30, described later).

Each of the first and second flappers 14/16 is rotatably mounted to both of the mounting posts 10 via respective flapper spindles 22/24. In the described embodiment, two first flapper spindles 22 are attached to first flapper 14 at opposed ends of the base 26A of the first flapper 14, on opposed sides 14A/14B of the first flapper 14. Two second flapper spindles 24 are attached to the second flapper 16 at opposed ends of the base 26B of the second flapper 16, on opposed sides 16A/16B of the second flapper 16. The flapper spindles 22/24 extend outwardly from lugs 23 upstanding from an upper surface of the flapper element. The flapper spindles 22/24 are integral with the lugs 23 in this embodiment; however, in alternative arrangements, the flapper spindles 22/24 may be received, either rotatably or fixed, in bores in the lugs 23. As can be seen, the lugs 23 do not extend across the entire width of the flapper elements, and extend only a limited amount inwardly from an edge of each flapper 14/16. The lugs 23 need only be long enough to provide a suitable support for the flapper spindles 22/24.

One first flapper spindle 22 and one second flapper spindle 24 is mounted to each mounting post 10.

The mounting posts 10 may each include a pair of bores 28 for receiving the respective flapper spindles 22/24.

Alternatively, in a different arrangement (not illustrated) additional mounting posts may be provided on either side of the valve openings 6A/6B such that each flapper spindle 22/24 is mounted to a separate mounting post. Thus, there may be two mounting posts of each side of the valve openings 6A/6B. In another alternative arrangement (also not illustrated), mounting posts may include opposed recesses for receiving flapper spindles 22/24 therebetween.

As illustrated in this embodiment, the flapper spindles 22/24 may be integrally formed with the flappers 14/16 and received in the bores 28 of the mounting posts 10. Alternatively the flapper spindles 22/24 may be formed separately from the flappers 14/16 and mounted thereto, for example by lugs formed on the flappers. Those lugs may include flapper bores and the flapper spindles 22/24 may be received in both the flapper bores and the mounting post bores 28. In this arrangement, the flapper spindles 22/24 may be simple cylindrical rods or pins.

The valve 2 may comprise a stop element, such as a stop pin 30, extending across the valve housing 4 between the mounting posts 10. Each stop pin 30 may be provided with a mounting portion 31 received in a respective bore 31A in the mounting post 10. The stop element 30 may be cylindrical, or have any other geometry, such as the more complex geometry shown in the illustrated embodiment. In the open position, the flappers 14, 16 contact the stop element 30. The flappers 14/16 are arranged with the stop element 30 such that the flappers 14, 16 do not rotate more than 90° from the plane of the flappers 14/16 in the closed position. This may be desirable to facilitate closing of the flappers. In the illustrated embodiment, the stop pin 30 comprises a pair of resilient tongue portions 30A extending transversely from a central portion 30B. Bumpers 46 provided on the flappers 14/16 will engage the tongue portions 30A in the open position.

In the illustrated embodiment of FIGS. 4 to 10, each flapper 14/16 comprises a primary flapper element 32A/32B and a secondary flapper element 34A/34B. The same features described with reference to the embodiment of FIGS. 1 to 3 apply to the embodiment of FIGS. 4 to 10.

Figure 4:
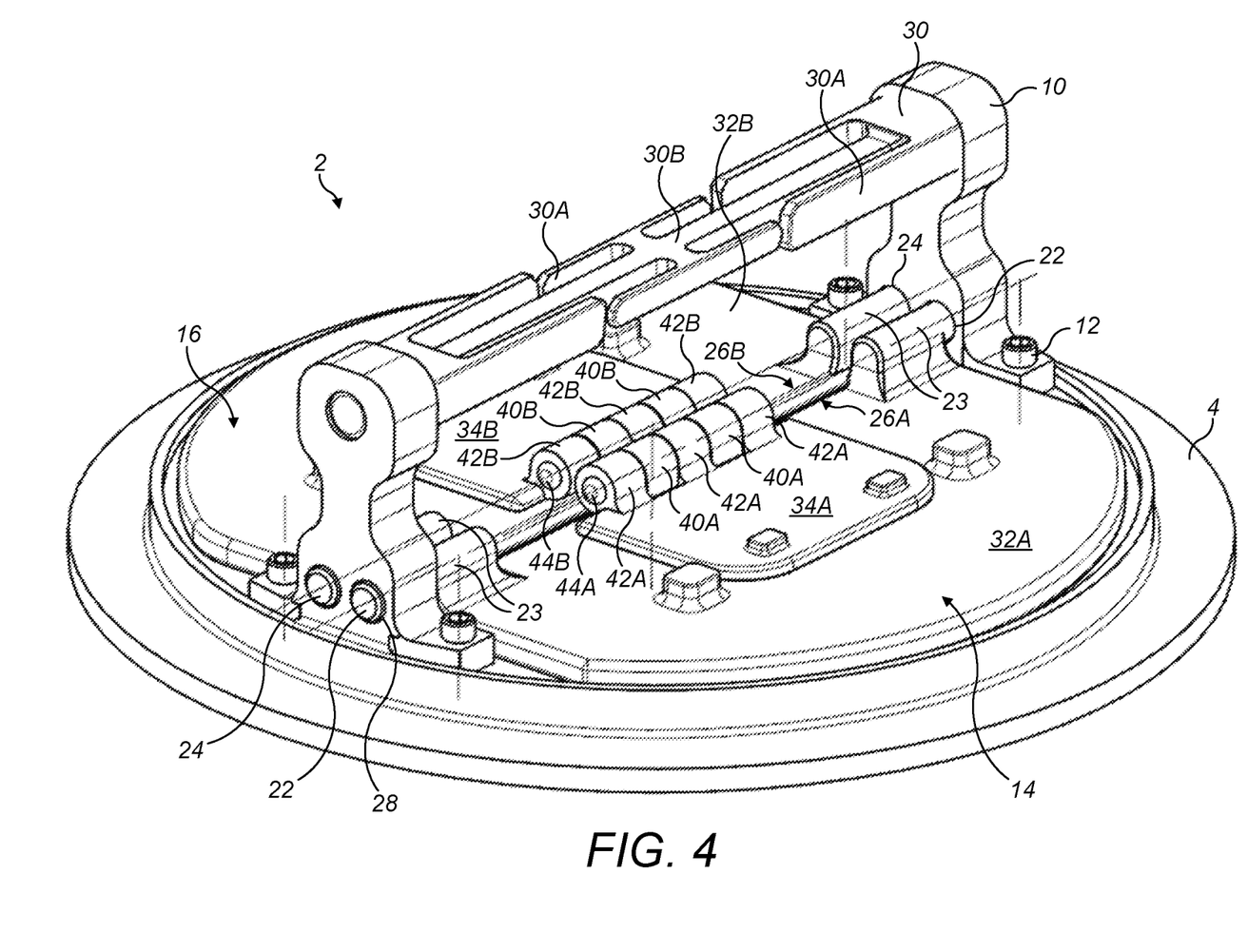
FIG. 4 shows a perspective view of second embodiment of a check valve in accordance with this disclosure.

As seen in FIG. 4, and also in FIGS. 5 to 8 and 10, the flapper spindles 22, 24 are attached to respective first flapper elements 32A/32B, but not to the secondary flapper elements 34A/34B.

Figure 9:
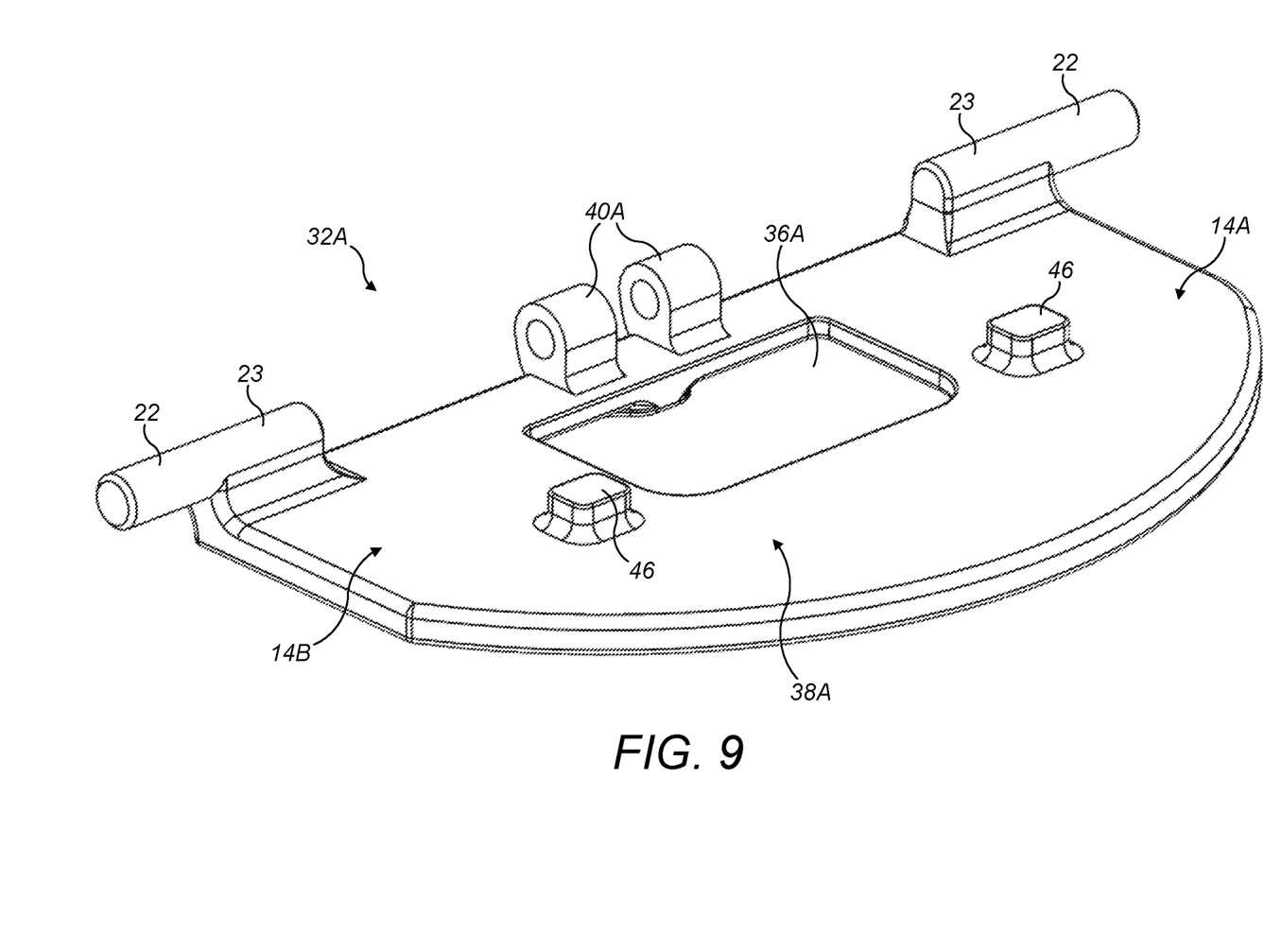
FIG. 9 shows a perspective view of a primary flapper element of the check valve of FIG. 4.
Figure 10:
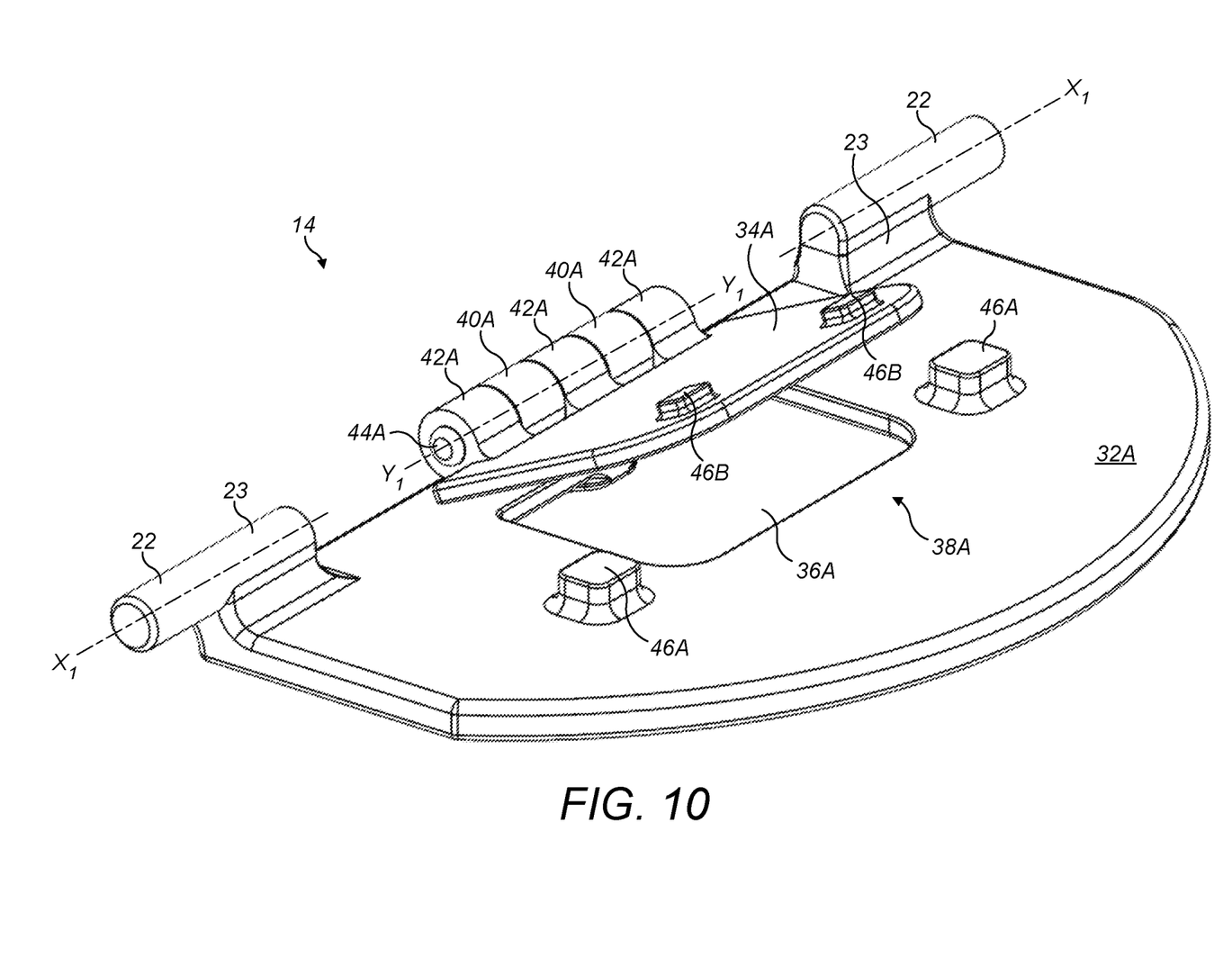
FIG. 10 shows a perspective view of a flapper of the check valve of FIG. 4.

Each primary flapper element 32A/32B is generally planar and is D-shaped, as particularly apparent from FIG. 9. It is noted that although FIGS. 9 and 10 illustrate the flapper elements 32A/34A of the first flapper 14, similar arrangements may be used for the second flapper 16.

A flapper opening 36A/36B is formed through a central region 38A/38B of each primary flapper element 32A/32B. In this embodiment, the flapper opening 36A/36B is generally rectangular in shape, but other shapes of flapper opening 36A/36B, for example circular, oval or ellipsoidal, are contemplated within the scope of the disclosure. The flapper opening 36A/36B is positioned generally centrally between the sides of each primary flapper element 32A/32B, but is offset from the centre of the primary flapper element 32A/32B in a direction towards the respective axis $X_1/X_2$.

Each secondary flapper element 34A/34B is generally planar and may be generally rectangular as illustrated.

Each secondary flapper element 34A/34B is pivotally mounted about a secondary flapper axis $Y_1/Y_2$, such that it may rotate relative to a respective primary flapper element 32A/32B. The flapper opening 36A/36B may thereby open and close. The secondary flapper axis $Y_1$ of the first flapper 14 may be coaxial with the first axis $X_1$ and the secondary flapper axis $Y_2$ of the second flapper 16 may be coaxial with the second axis $X_2$. The moment of inertia of rotating the primary flapper elements 32A/32B with the secondary flapper elements 34A/34B may thereby be reduced, relative to an alternative arrangement where the secondary flapper axes $Y_1/Y_2$ are positioned further from the centre of the valve 2.

Each of the primary and secondary flapper elements 32A, 32B, 34A, and 34B may comprise a plurality of connecting lugs 40A, 40B, 42A, and 42B. Connecting lugs 40A and 40B are on the primary flapper elements 32A/32B and connecting lugs 42A/42B are on the secondary flapper elements. A pin 44A/44B is received within each of the connecting lugs 40A, 40B, 42A, and 42B for joining the primary and secondary flapper elements 32A, 32B, 34A, and 34B. As shown in the illustrated embodiment there may be two connecting lugs 40A/40B on each primary flapper element 32A/32B and there may be three connecting lugs 42A/42B on each secondary flapper element 34A/34B. The connecting lugs 40A, 40B, 42A, and 42B may be interleaved such that there is no gap or a minimal gap between the lugs 40A, 40B, 42A, and 42B, such that they may still rotate relative to one another. In alternative arrangements, there may be other numbers of connecting lugs 40A, 40B, 42A, and 42B on each of the flapper elements. The outermost connecting lugs 42A/42B on the secondary flapper elements 34A/34B may be positioned outside the outermost connecting lugs on the primary flapper element 32A/32B, as shown in FIGS. 4 to 8 and 10.

Due to the spacing between the primary flapper lugs 23, the connection lugs 40A, 40B, 42A, and 42B may easily be accommodated therebetween.

The connecting lugs 40A, 40B, 42A, and 42B may be cylindrical with a fillet at the point where they are attached to the primary or secondary flapper elements 32A, 32B, 34A, and 34B. Each connecting lug 40A, 40B, 42A, and 42B has a bore therethrough for receiving the respective pin 44A/44B.

As the skilled person will appreciate, other arrangements of connecting lugs 40A, 40B, 42A, and 42B on the flapper elements 32A, 32B, 34A, and 34B may be possible. For example, pins 44A/44B may each comprise pins with two or more parts to facilitate assembly in check valve arrangements with less space. The pins 44A/44B may be split part way along their length to provide multiple, shorter parts of each pin. Pins with multiple parts may allow for assembly, or more straightforward assembly in check valves 2 with limited space.

The primary flapper elements 32A/32B are formed with primary flapper bumpers 46A and the secondary flapper elements 34A/34B are formed with secondary flapper bumpers 46B As in the earlier embodiment, a stop pin 30 is provided between the mounting posts 10. This stop pin 30 is also formed with primary and secondary resilient tongues 30A/30A' with which the primary and secondary flapper bumpers 46A/46B will separately engage in the open position of the flappers.

The secondary flapper element 34A/34B is configured to open before the primary flapper elements 32A/32B, for example, in the manner described below.

Figure 5:
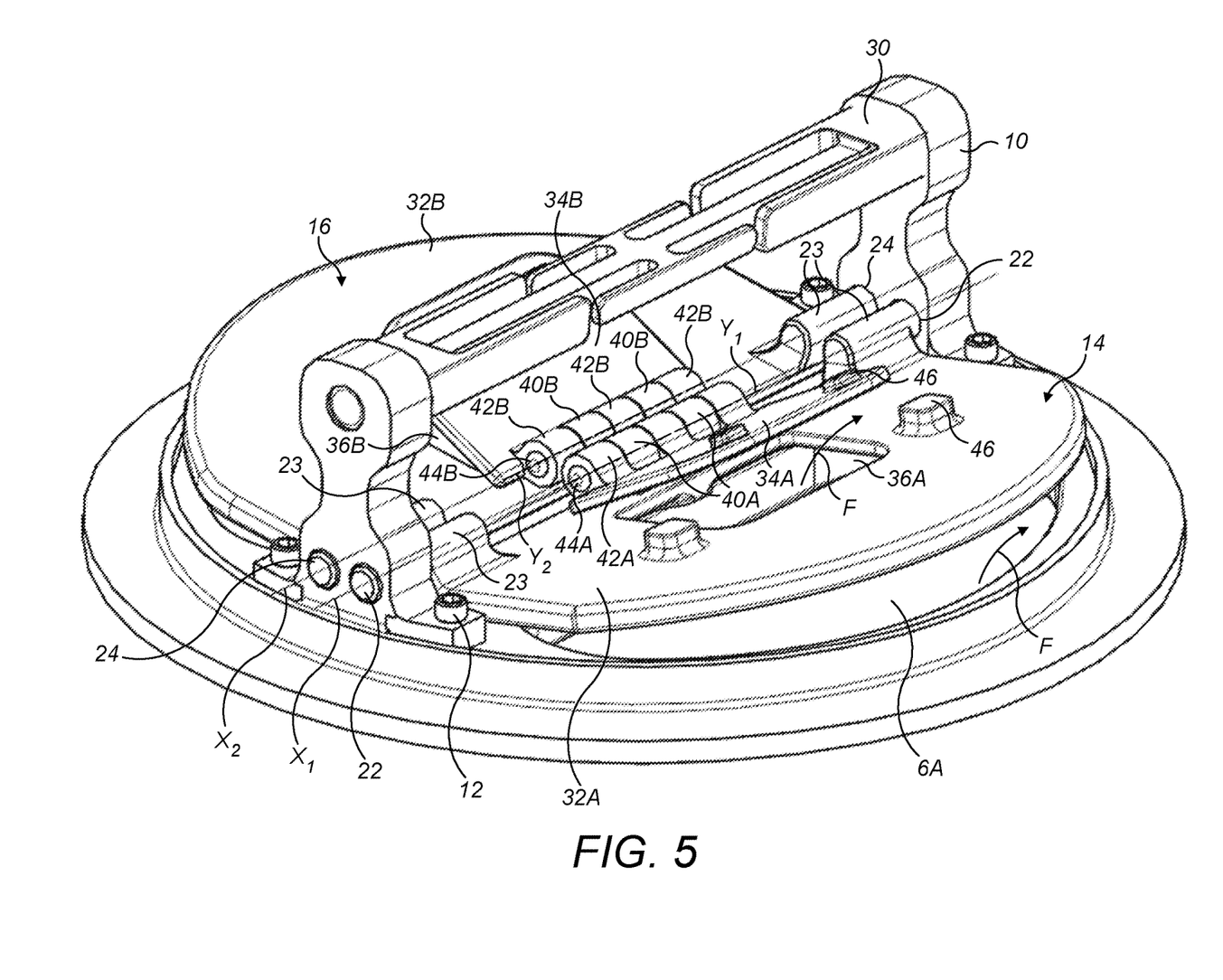
FIG. 5 shows a perspective view of the check valve of FIG. 4 with the flappers partially open.
Figure 6:
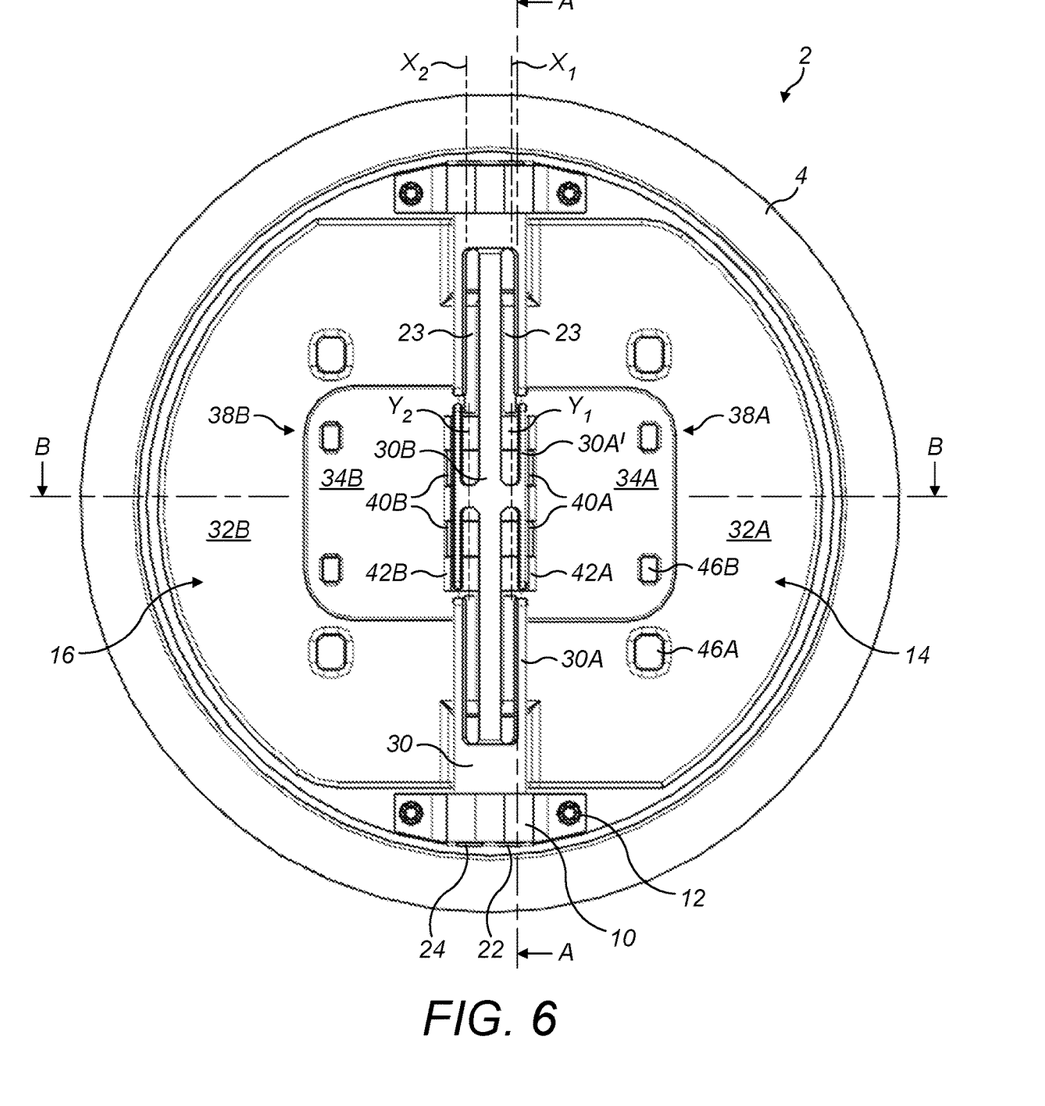
FIG. 6 shows a plan view of the check valve of FIG. 4.
Figure 7:
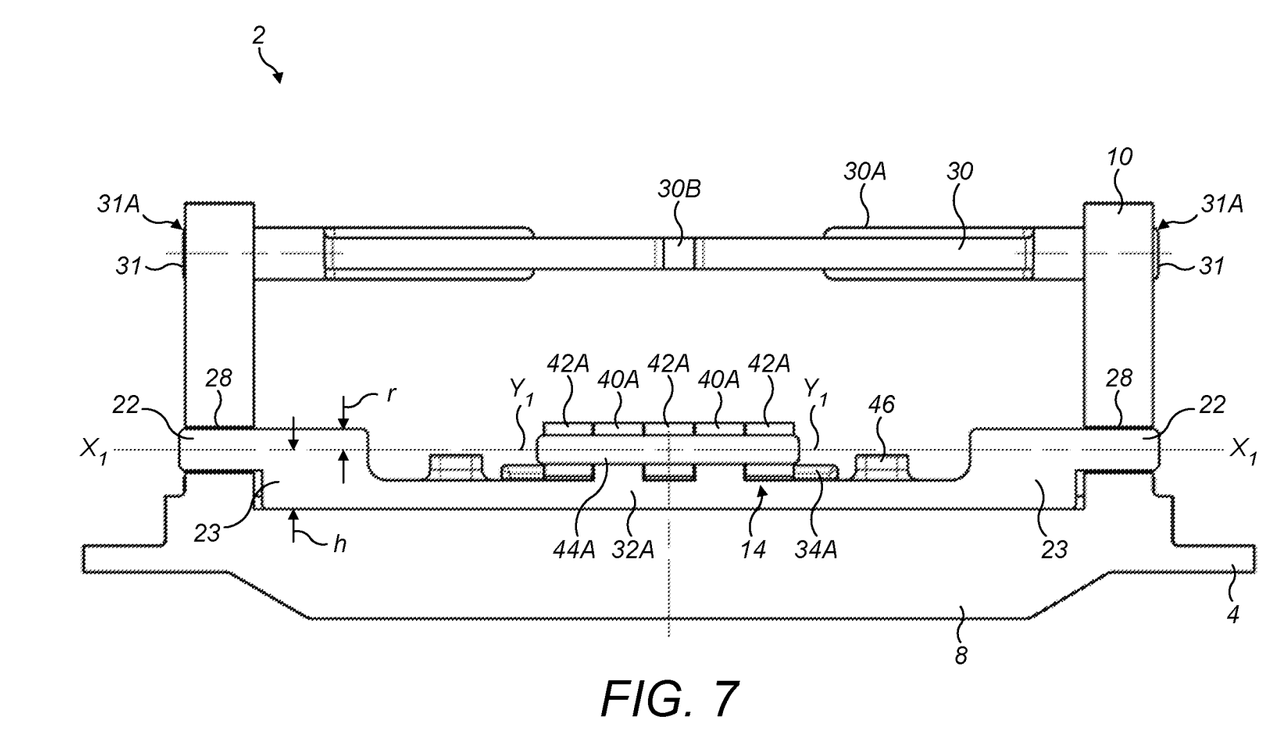
FIG. 7 shows a sectional view of the check valve of FIG. 4, along line A-A of FIG. 6.
Figure 8:
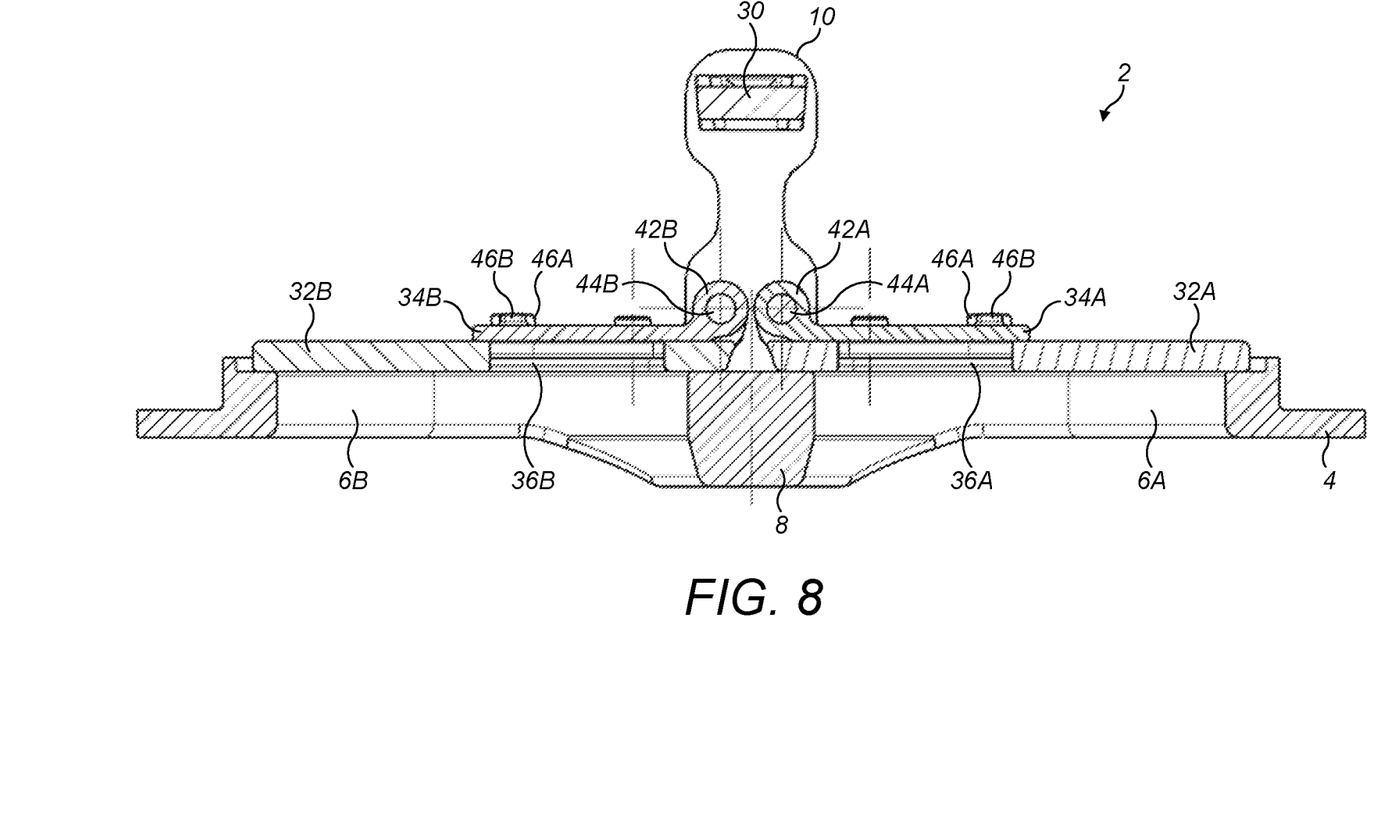
FIG. 8 shows another sectional view of the check valve of FIG. 4 along line B-B of FIG. 6.

When an opening pressure differential is applied to the check valve 2 in an opening direction A, the secondary flapper elements 34A/34B will start to pivot before the primary flapper elements 32A/32B, due to their lower mass and inertia. The rotation of the secondary flapper elements 34A/34B relative to the primary flapper elements 32A/32B will begin to open the flapper openings 36A/36B. This has the effect of reducing the relative pressure acting on the primary flapper elements 32A/32B as in effect, some of the fluid flow F is vented through the flapper openings 36A/36B. This in turn means that the primary flapper elements 32A/32B will pivot less quickly than in a unitary construction. FIG. 5 shows the check valve 2 with both the primary flapper elements 32A/32B and the secondary flapper elements 34A/34B in a partially open position. In their fully open position, the flapper elements 32A, 32B, 34A, and 34B will contact the stop element 30 such that they cannot rotate further.

The secondary flapper elements 34A/34B will continue to rotate until they impact the stop element 30. In this position, the primary flapper elements 32A/32B are have not yet reached their fully open positions. The primary flapper elements 32A/32B will continue to rotate until they impact the now fully opened secondary flapper elements 34A/34B.

Referring to each of the embodiments, the check valve 2 is assembled in a particular order. In the embodiment where the flapper spindles 22/24 are integrally formed with the flappers 14/16, the flappers 14/16 are mounted to the mounting posts 10 by inserting the spindles 22/24 into the mounting post bores 28 before the mounting posts 10 are attached to the valve housing 4, for example by fasteners 12.

In another embodiment the flapper spindles 22/24 are separate from separately from the flappers 14/16 and mounted thereto, for example, by lugs with flapper bores, and within mounting post bores 28, the flappers 14/16 may be mounted to the mounting posts 10 either before or after the mounting posts 10 are attached to the valve housing 4, for example by fasteners 12. If the flappers 14/16 are mounted to the mounting posts 10 after the mounting posts 10 are attached to the valve housing 4, the mounting posts 10 may be integrally formed with the valve housing 4, for example by casting or additive manufacturing.

It will be appreciated that the above embodiments are exemplary only and that modifications may be made to the constructions illustrated without departing from the scope of the disclosure. For example, other forms of stop may be provided. In some embodiments, separate stops may be provided for the first and second flappers 14/16. The stop 30 may be resilient (for example, as illustrated) or include dampers to reduce the impact of the flappers 14/16 hitting the stop.

The various embodiments described, by having separate axes of rotation $X_1/X_2$ for the first and second flappers 14/16 reduce the transmission of vibrations or forces from one flapper 14, 16 to the other 16, 14 via a common hinge pin when the flappers impact the stop 30. This reduces the possibility of damage to the flappers 14/16 through cracking.

Also, since the flappers 14/16 are effectively mounted to the mounting posts 10 via spindles 22/24 at their extreme edges, the distance between points of reaction of the flappers 14/16 with the static structure is maximized, compared to prior art arrangements where flappers were mounted to a hinge pin at positions between their edges. This also acts to minimize the amplitude of vibration of the flappers 14/16. The resilient nature of the stop 30 may also reduce impact forces and thereby damage to the flappers 14/16.

Although an embodiment of this invention has been disclosed, a worker of ordinary skill in this art would recognize that certain modifications would come within the scope of this disclosure. For that reason, the following claims should be studied to determine the true scope and content of this disclosure.

What is claimed is:

1. A check valve comprising:
    a valve housing defining a first valve opening and a second valve opening;
    a first flapper pivotably mounted around a first axis for rotation relative to the housing between an open position at which the first flapper permits fluid flow through the first valve opening and a closed position at which the first flapper prevents fluid flow through the first valve opening;
    a second flapper pivotably mounted around a second axis for rotation relative to the housing between an open position at which the second flapper permits fluid flow through the second valve opening and a closed position at which the second flapper prevents fluid flow through the second valve opening;
    a stop pin arranged such that the first and second flappers will contact the stop pin in their open positions;
    wherein the first axis is spaced laterally from to the second axis;
    wherein the housing comprises opposed first and second mounts, each of the mounts having a mounting post;
    wherein the stop pin extends across the valve housing between the mounting posts;
    wherein the first and second flappers are pivotably mounted between the mounts on respective flapper spindles;
    wherein each of the first and second mounts comprises a bore; and
    wherein each of the flapper spindles is received within a respective bore.

2. The check valve of claim 1, wherein the first axis is parallel to the second axis.

3. The check valve of claim 1, wherein:
    each said flapper spindle is formed integrally with a respective flapper.

4. The check valve of claim 1, wherein each said flapper spindle is formed separately from a respective flapper and mounted thereto.

5. The check valve of claim 1 wherein each said flapper spindle is formed separately from a respective one of said first and second flappers and a respective one of said mounts and received in said respective bores therein.

6. The check valve of claim 1, wherein:
    the first flapper is symmetrical about a third axis transverse to the first axis; and
    the second flapper is symmetrical about a fourth axis transverse to the second axis.

7. The check valve of claim 1, wherein:
    each of said first and second flappers comprises a primary flapper element and at least one secondary flapper element;
    the primary flapper element further comprises at least one flapper opening formed therethrough; and
    the at least one secondary flapper element is pivotally mounted about a secondary flapper axis such that the at least one secondary flapper element may rotate relative to the primary flapper element for opening and closing the at least one flapper opening in the primary flapper element.

8. The check valve of claim 7, wherein the secondary flapper axis of the first flapper is coaxial with the first axis and the secondary flapper axis of the second flapper is coaxial with the second axis.

9. The check valve of claim 8, wherein:
    each of the primary flapper elements and the each of secondary flapper elements have at least one connecting lug; and
    a pair of connecting pins configured to be rotatably received in the connecting lugs of each of said first and second flappers for mounting the secondary flapper elements to the primary flapper elements.

10. The check valve assembly as set forth in claim 1, wherein said stop pin is received in a mount bore in each of the mounting posts of the first and second mounts.

11. The check valve assembly as set forth in claim 10, wherein said stop pin is cylindrical.

12. The check valve assembly as set forth in claim 1, wherein the stop pin includes a pair of resilient tongue portions extending transversely from a central portion, and each of the first and second flappers include bumpers which engage the tongue portions in the open position.

13. The check valve assembly as set forth in claim 1, wherein each of the first and second flappers contact the same stop pin in the open position.

14. A method of making a check valve comprising the steps of:
    pivotably mounting first and second flappers on a pair of opposed mounts, each mount comprising a mounting post and a bore, wherein the first flapper is pivotally mounted on a first axis by a first flapper spindle in a respective bore, and between the opposed mounts for rotation between an open position at which the first flapper will permit fluid flow and a closed position at which the first flapper will prevent fluid flow, and said second flapper is pivotally mounted on a second axis by a second flapper spindle in a respective bore, and between the opposed mounts for rotation between an open position at which the second flapper will permit fluid flow and a closed position at which the second flapper prevents fluid flow, and wherein the first axis is spaced laterally from the second axis;
    mounting a stop pin to the opposed mounts such that the first and second flappers will contact the stop pin in their open positions;

then attaching the pair of opposed mounts to a valve housing defining a first valve opening for being opened and closed by said first flapper and a second valve opening for being opened and closed by said second flapper; and wherein mounting the stop pin to the opposed mounts includes mounting the stop pin such that the stop pin will extends across the valve housing between the mounting posts after the opposed mounts are attached to the valve housing.

15. The method as set forth in claim 14, wherein said first axis is parallel to said second axis.

16. The method as set forth in claim 14, wherein said stop pin is received in a mount bore in each of the mounting posts of the first and second mounts.

17. The method as set forth in claim 16, wherein said stop pin is cylindrical.

18. The method as set forth in claim 14, wherein the stop pin includes a pair of resilient tongue portions extending transversely from a central portion, each of the first and second flappers include bumpers which engage the tongue portions in the open position.

19. The method as set forth in claim 14, wherein each of the first and second flappers contact the same stop pin in the open position.

* * * * *